United States Patent [19]
Farrell

[11] 3,923,075
[45] Dec. 2, 1975

[54] POWER TRANSMISSION
[75] Inventor: Robert G. Farrell, Royal Oak, Mich.
[73] Assignee: Sperry Rand Corporation, Troy, Mich.
[22] Filed: May 16, 1974
[21] Appl. No.: 470,472

[52] U.S. Cl. ............... 137/491; 137/494; 251/337
[51] Int. Cl.² .................. G05D 16/10; F16K 17/00
[58] Field of Search .......... 137/491, 489, 488, 494, 137/492.5, 492; 251/50, 51, 53, 48, 337

[56]     References Cited
        UNITED STATES PATENTS

| | | | |
|---|---|---|---|
| 1,466,450 | 8/1923 | Kothe | 251/53 X |
| 2,887,123 | 5/1959 | Becker | 251/337 X |
| 3,160,076 | 12/1964 | Martin | 137/491 X |
| 3,221,764 | 12/1965 | Elbogen et al. | 137/489 X |
| 3,246,669 | 4/1966 | Adams et al. | 137/489 X |
| 3,416,561 | 12/1968 | Kokaly | 137/491 |
| 3,785,398 | 1/1974 | Lonnemo | 137/494 X |

Primary Examiner—Martin P. Schwadron
Assistant Examiner—Robert J. Miller

[57]         ABSTRACT

A pressure relief system for hydraulic power transmissions has a main relief valve and a pilot relief valve controlling the former. The spring force of the pilot relief valve is varied by two modifiers, one of which decreases the spring force as the system pressure increases and the other of which increases the spring force as the system pressure increases. A dashpot delays the action of the second modifier to thereby reduce the pressure overshoot when the system is subjected to sudden pressure transients.

7 Claims, 2 Drawing Figures

POWER TRANSMISSION

In modern high pressure hydraulic power transmission systems, the control of maximum pressure through relief valves has been unsatisfactory under certain conditions, especially those which produce sudden transients in the pump delivery line. Ordinary relief valves tend to respond too slowly and thus permit the system pressure to rise beyond the nominal relief valve pressure, causing wide swings before settling down to the intended value. This problem has been attacked in various ways, among them being the one illustrated in the patent to Lonnemo et al. U.S. Pat. No. 3,785,398 of Jan. 15, 1974. While such a system produces a marked improvement over ordinary pressure relief systems, its ability to reduce overshooting depends to a large extent on the initial system pressure existing at the time that a sudden transient rise occurs. The closer this initial pressure is to the nominal relief pressure of the system, the greater the overshoot will be.

The object of the present invention is to provide a pressure relief system in which overshooting is greatly reduced, even under conditions where the initial pressure prior to a sudden transient rise is close to the nominal relieving pressure.

This is accomplished by the provision of a fluid pressure relief system responsive to the rate of pressure rise in a fluid power transmission system which comprises a body having a bore with an inlet and an outlet connected by a valving passage, a valve slidable in the bore and urged by inlet pressure to open the passage to the outlet, main spring means for urging the valve and passage into closing relation, a first spring force modifier comprising a piston exposed to inlet pressure and a biasing spring opposing that pressure and arranged to decrease the force of the main spring as the inlet pressure increases, a second spring force modifier exposed to inlet pressure and arranged to increase the force of the main spring as the inlet pressure increases, and dashpot means for delaying the action of the second modifier.

IN THE DRAWINGS

Figure 1:
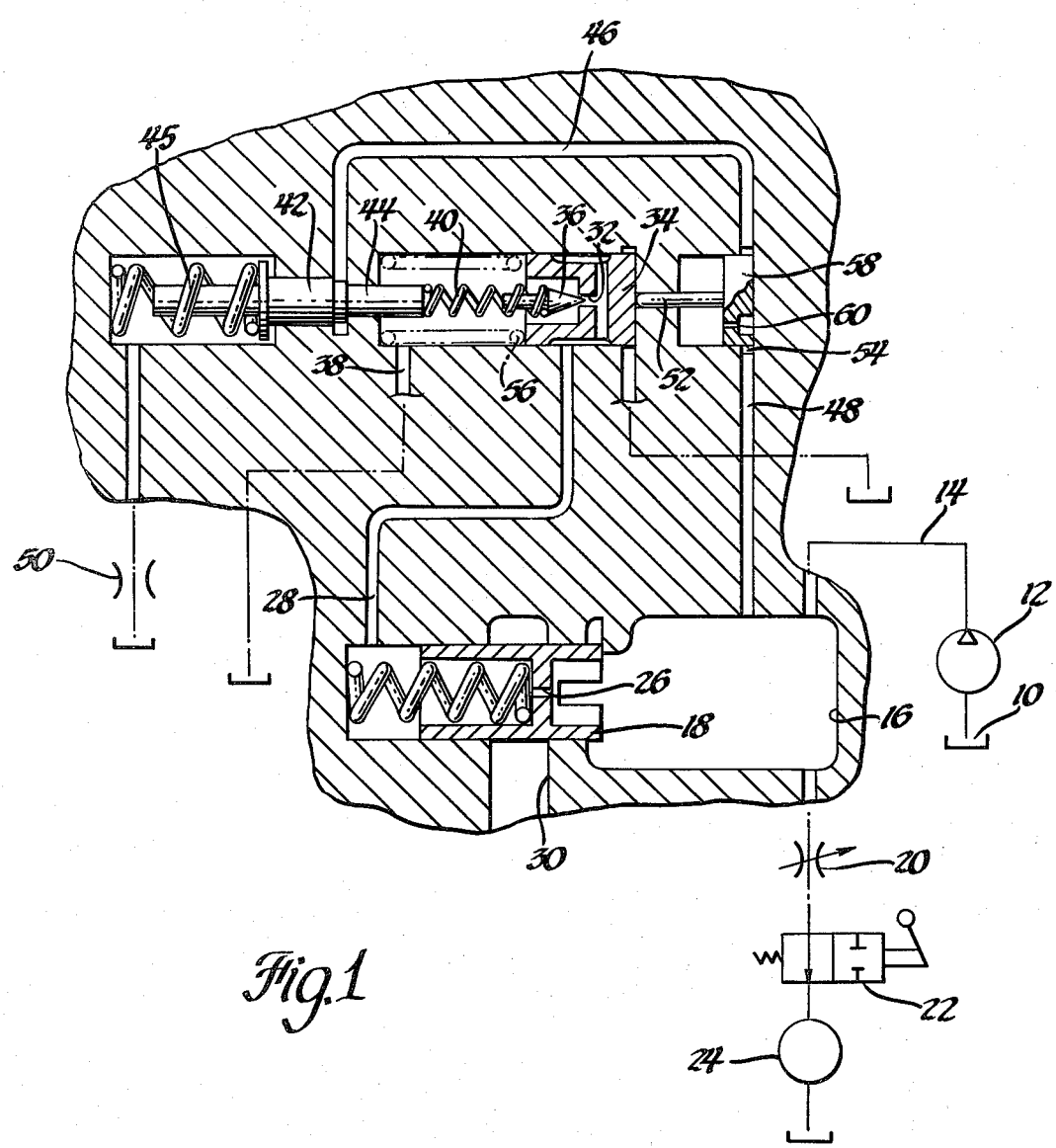
FIG. 1 is a diagrammatic circuit of a pressure relief system embodying a preferred form of the present invention.

Referring now to FIG. 1, a pump 12 delivers oil from a sump 10 through a delivery line 14 to the inlet chamber 16 of a main relief valve 18 and thence through an adjustable restrictor 20, a directional valve 22 and a fluid motor 24 to the sump. The valve 18 is typically a pilot controlled type of the well known form in which the spool is spring biased to the right by a relatively light spring and is hydraulically balanced by equal pressures on opposite sides because of the communication provided by the restricted orifice 26. When flow above a certain rate takes place through the pilot control duct 28, the pressure drop through the orifice 26 reduces the pressure in the left hand chamber sufficiently to allow the spool to move to the left and open to relieve pressure in the inlet chamber 16 through the exhaust duct 30.

Flow through the duct 28 is controlled by a pilot relief valve consisting of a valving passage 32 carried in a movable seat member 34 and a spring loaded valve 36 which, when open, allows flow through the passage 32 and out to the sump at 38. Valve 36 is biased toward the seat 34 by a main spring 40.

The force of spring 40 is adjusted by a first spring modifier comprising a piston 42 having a stem 44 engaging a spring 40 and exposed to inlet pressure through a line 46–48 extending from the main inlet chamber 16. This pressure reacts on the annular area represented by the difference in diameter between the two portions 42 and 44. A spring 45 urges the piston 42 toward the right. If desired, a small damping resistance 50 may be provided for slightly damping the motion of piston 42.

A second spring modifier for the main spring 40 is provided by means of a small plunger 52 which abuts the right face of the movable valve seat 34 and is exposed to the pressure in a chamber 54 between passages 46 and 48. The thrust of plunger 52 on seat 34 is resisted by a spring 56. A large piston 58 having a restricted orifice 60 therethrough is attached to the plunger 52 and serves as a dashpot to limit the rate of travel of the plunger 52 to the left. In order for the plunger 52 and the piston 58 to move to the left, fluid must be transferred from the left face of piston 58 to its right face and such fluid must pass through the restricted orifice 60 which limits the speed at which piston 58 can move to the left.

In operation with the power transmission function normal, if it be assumed that the delivery line pressure in inlet chamber 16 has gradually risen to a value near the nominal relief pressure, then this gradual rise will have gradually shifted the piston 58 to the left, allowing the left end of main spring 40 to back off. At the same time, however, plunger 52 will have also moved to the left carrying with it the seat 34 and the valve 36, thus moving the right hand end of spring 40 a corresponding distance to the left. This may be an exactly equal distance or somewhat more or less than the motion of piston 42 depending upon the relative rates of springs 45 and 56 and upon the comparative areas of the annular end of piston 42 and of the plunger 52.

Upon the imposition of a sudden pressure rise in the inlet chamber 16 as, for example when the valve 22 is quickly shifted, this pressure rise will be transmitted instantly through conduits 48 and 46 to the annular area of piston 42 which will then move further to the left, backing off on the main spring 40 and allowing the pilot valve 36 to open quickly and relieve the pressure in the left hand side of the main valve 26. The valve seat 34 does not immediately follow up this leftward motion because the large piston 58 carried by the plunger 52 must discharge the fluid on the left face of piston 58 through the restriction 60 and this dashpot action retards the leftward motion of plunger 52 and seat 34. Thus, both the pilot valve and the main valve open quickly and prevent substantial overshooting of the system pressure when such a transient rise occurs.

Figure 2:
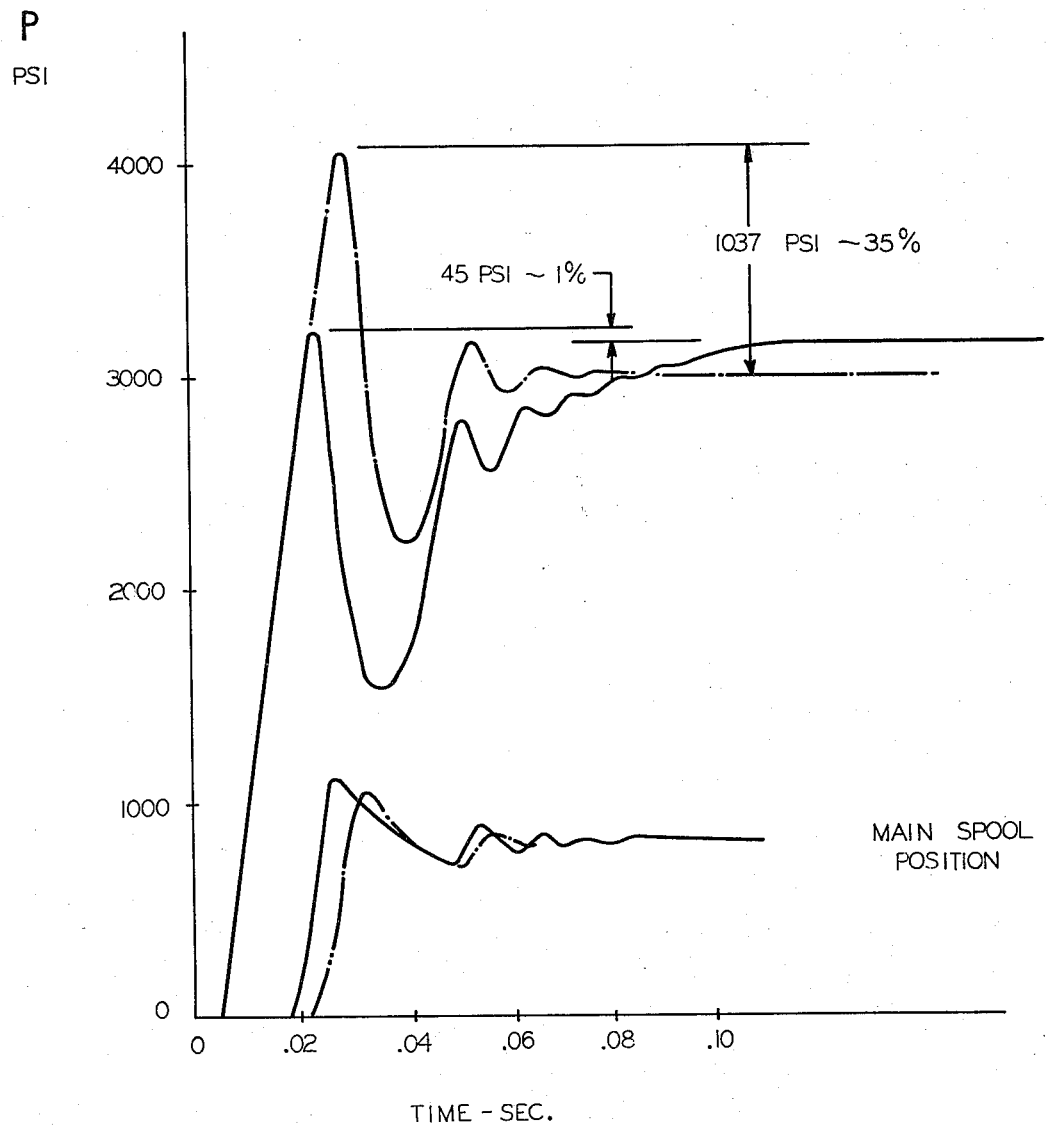
FIG. 2 is a plot of instantaneous pressures and of valve positions comparing a conventional relief valve with the present invention in response to identical pressure transients.

The performance of a valve of this character as compared with a conventional pilot relief valve of comparable size in a comparable system and under the imposition of a comparable pressure transient is plotted in the upper curves of FIG. 2. The dot-dash line illustrates the pressure response of a conventional pilot operated relief valve and shows a pressure overshoot of approximately 35 per cent of the nominal relieving pressure. The solid line curve illustrates the performance of a valve made according to the present invention and shows an overshoot of only 1 per cent of nominal relieving pressure. The lower curves in FIG. 2 illustrate the motion of the main valve spool of the two valves with the dot-dash line illustrating the conventional construction and the solid line illustrating the present invention. It will be seen that the main valve opens much faster and somewhat wider than the conventional valve.

I claim:

1. A fluid pressure relief system responsive to the rate of pressure rise in a fluid power transmission comprisng a body having a bore with an inlet and an outlet connected by a valving passage, a valve movable in the bore and urged by inlet pressure to open the passage to the outlet, mainspring means for urging the valve and passage into closing relation, a first spring force modifier comprising a piston exposed to inlet pressure and a biasing spring opposing that pressure and arranged to decrease the force of the mainspring as the inlet pressure increases, a second spring force modifier exposed to inlet pressure and arranged to increase the force of the mainspring as the inlet pressure increases, and dashpot means for delaying the action of the second modifier.

2. A pressure relief system as defined in claim 1 wherein the second modifier includes an independent biasing spring.

3. A pressure relief system as defined in claim 1, wherein one modifier acts directly upon the mainspring and the other modifier acts upon the mainspring through the movable valve.

4. A fluid pressure relief system as defined in claim 1 which includes a shiftable valve seat and in which one of the modifiers is arranged to shift the valve seat toward and away from the valve.

5. A fluid pressure relief system as defined in claim 1 wherein said valve is the pilot valve controlling a main valve through a fixed orifice which bypasses the main stage.

6. A fluid pressure relief system as defined in claim 5 wherein at least one of the modifiers is responsive to the pressure ahead of the main stage.

7. A fluid pressure relief system as defined in claim 5 wherein both modifiers are responsive to the pressure ahead of the main stage.

* * * * *